(12) United States Patent
Anikin et al.

(10) Patent No.: US 9,143,533 B2
(45) Date of Patent: Sep. 22, 2015

(54) INTEGRATING COMMUNICATIONS

(75) Inventors: Sergei Anikin, Tallinn (EE); Neil Dodd, Buckinghamshire (GB); Scott Miller, San Jose, CA (US); Natasha Sopieva, St Albans (GB)

(73) Assignee: Skype, Dublin (IE)

( * ) Notice: Subject to any disclaimer, the term of this patent is extended or adjusted under 35 U.S.C. 154(b) by 201 days.

(21) Appl. No.: 12/902,935

(22) Filed: Oct. 12, 2010

(65) Prior Publication Data

US 2012/0087367 A1  Apr. 12, 2012

(51) Int. Cl.
| | |
|---|---|
| *H04L 12/66* | (2006.01) |
| *H04L 29/06* | (2006.01) |
| *G06Q 10/10* | (2012.01) |
| *G06Q 50/00* | (2012.01) |
| *H04L 12/58* | (2006.01) |

(Continued)

(52) U.S. Cl.
CPC ............ *H04L 65/1069* (2013.01); *G06Q 10/10* (2013.01); *G06Q 50/01* (2013.01); *H04L 51/046* (2013.01); *H04L 51/32* (2013.01); *H04L 67/02* (2013.01); *H04L 67/306* (2013.01); *H04M 1/2535* (2013.01); *H04M 1/274516* (2013.01); *H04W 4/206* (2013.01); *H04L 51/28* (2013.01); *H04L 67/24* (2013.01)

(58) Field of Classification Search
CPC ....... H04L 51/046; H04L 51/28; H04L 51/32; H04L 65/1069; H04L 67/02; H04L 67/24; H04L 67/306; H04M 1/2535; H04M 1/274516; H04W 4/206
USPC .................... 370/352; 455/415, 461; 707/706
See application file for complete search history.

(56) References Cited

U.S. PATENT DOCUMENTS

2007/0238472 A1* 10/2007 Wanless ................... 455/461
2009/0125593 A1   5/2009 Hiir et al.
(Continued)

FOREIGN PATENT DOCUMENTS

| CN | 1750518 | 3/2006 |
|---|---|---|
| CN | 101506769 | 8/2009 |

(Continued)

OTHER PUBLICATIONS

"Getting the most from Skype", *How-to Guides—IT & Internet*, (Jul. 4, 2010), 10 pages.
"International Search Report and Written Opinion", Application No. PCT/EP2011/054641, (Jul. 5, 2012), 19 pages.
"Skype Guide: How to Share Skype with a Friend?", (Mar. 24, 2008), 2 pages.

(Continued)

*Primary Examiner* — Asad Nawaz
*Assistant Examiner* — Stephanie Chang
(74) *Attorney, Agent, or Firm* — Jim Ross; Micky Minhas

(57) ABSTRACT

A method of accessing a first communication system of a first communication provider via a packet-based network, the first communication system maintaining a first list of contacts being users of the first communication system. The method comprises establishing a contact-sharing channel with a second communication system of a second, partner communication provider, wherein the second communication system is accessible via an independently executable web-browser and the packet-based network, and wherein the second communication system maintains second group of contacts being users of the second communication system. The contact-sharing channel is used to fetch contact information of one or more of the second contacts, so as to display at least part of the fetched contact information in the client application and establish a communication based on at least part of the fetched contact information.

25 Claims, 5 Drawing Sheets

(51) Int. Cl.
*H04M 1/253* (2006.01)
*H04M 1/2745* (2006.01)
*H04W 4/20* (2009.01)
*H04L 29/08* (2006.01)

(56) References Cited

U.S. PATENT DOCUMENTS

2009/0300139 A1* 12/2009 Shoemaker et al. .......... 709/217
2010/0306249 A1* 12/2010 Hill et al. ...................... 707/769
2011/0274260 A1* 11/2011 Vaananen .................. 379/93.23

FOREIGN PATENT DOCUMENTS

WO  WO-2007112594      10/2007
WO  WO 2009/062760 A1   5/2009

OTHER PUBLICATIONS

Gough, Michael "Skype Me! From Single User to Small Enterprise and Beyond", (Dec. 31, 2006), 4 pages.
Helft, Miguel "Facebook and Skype Plan Integration", (Sep. 29, 2010), 1 page.
Schroeder, Stan "Skype and Facebook to Announce Partnership", (Sep. 29, 2010), 2 pages.
Swisher, Kara "Exclusive: Facebook and Skype Readying Deep Integration Partnership", (Sep. 29, 2010), pp. 1-3.
Zee, "This should be big. Facebook and Skype "deep integration" on the way", (Sep. 29, 2010), 2 pages.
"Examination Report", EP Application No. 11711844.8, Jun. 10, 2014, 6 pages.
"Foreign Office Action", CN Application No. 201180049426.0, Feb. 15, 2015, 19 pages.

* cited by examiner

INTEGRATING COMMUNICATIONS

FIELD OF THE INVENTION

The present invention relates to integrating the communication systems of different communication providers.

BACKGROUND

The Internet is used to provide a variety of different forms of communication between users. Two popular forms of communication are: (a) social networking sites, and (b) live voice or video calling using voice and/or video over internet protocol ("VoIP").

A problem with existing Internet-based communication tools is that different software providers frequently offer independent, incompatible products. For example, a first software provider may offer a VoIP client, which may become very popular with a large number of users communicating with each other via this VoIP client. Similarly, a second software provider may provide a social networking website which may also become popular and gain a large user base. To gain the benefit of both these services, a user must run both the VoIP client and a web-browser separately. Furthermore, conventionally the user must maintain separate contact lists for each of the two services which is a cumbersome and inconvenient arrangement for the user, and also does not maximise the potential user base from the perspective of the communication providers.

There is therefore a need for a technique to address the aforementioned problems with separate internet-based communication tools in order to provide integration and interoperability.

In some existing social networking sites, an instant messaging (IM) client is integrated within the website to allow a user of the social networking site to communicate with the user's social networking site contacts over IM. This only allows the user to communicate with users that are part of the user's social networking contact list.

It is also possible for the user to 'import contacts' from a social networking website to an instant messaging or VoIP client. However, in this case the user may only communicate with another user who is already signed up to use the instant messaging service. The user must otherwise invite the other user to sign up to the VoIP or instant messaging service (and the client application may present the first user with a window having controls enabling them to send the invitation by email). Furthermore, when the user selects to import contacts to the client it is necessary for the user to select which contacts he wishes to import. Should the user decide that he wishes to communicate with any other contacts from the social networking site it is necessary for him to perform a further 'import contacts' operation.

Furthermore, whilst it is possible to import contacts from one list of contacts to another, other contextual information such as presence information that is relevant to the network from which the contact was imported is lost.

SUMMARY

It is an aim of the present invention to address the above identified problems and further facilitate the integration of user bases from more than one communication system.

According to one aspect of the present invention, there may be provided an arrangement comprising: first network apparatus of a first communication provider, configured to provide a first communication system accessible via a client application and packet-based network, and to maintain a first list of contacts being users of the first communication system; second network apparatus of a second, partner communication provider, configured to provide a second communication system accessible via a web-browser and the packet-based network, and to maintain a second group of contacts being users of the second communication system; and a user terminal installed with a web-browser for accessing the second communication system, and further installed with an independently executable client application for accessing the first communication system; wherein the client application is configured to establish a contact-sharing channel with the second network apparatus in order to fetch contact information of one or more of the second contacts, display at least part of the fetched contact information, and establish a voice or video call with at least one of the second contacts via the first communication system based on at least part of the fetched contact information, the call being established directly based on a user selection of the displayed contact information.

For example the first network apparatus may comprise a network apparatus of a VoIP provider, configured to provide a VoIP communication system accessible via a VoIP client and the Internet, and to maintain a first list of contacts being users of the VoIP communication system, the communication client installed on said user terminal being an instance of the VoIP client. The second network apparatus may comprise a network apparatus of a partner social-networking provider, configured to provide a social-networking communication system accessible via the web-browser and the Internet.

Preferably the client application is configured to automatically maintain a list of the fetched contact information without requiring the user to initiate an operation to re-import contact information from the second communication system.

Further, the first communication system may require users to be accepted as contacts to communicate with one another, and the second communication system may also require users to be accepted as contacts to communicate with one another, and the client application may be configured to establish said call via the first communication system based on acceptance of the at least one second contact as a contact within the second communication, without requiring acceptance of that contact as a contact within the first communication system.

In a particularly preferred and advantageous embodiment, the fetched contact information may comprise an activity feed providing information on recent activity performed by one or more of the second contacts in respect of the second communication system; and the client application may be configured to display at least part of the activity feed within the client application, to generate a respective on-screen control in association with each of one or more second contacts occurring in the activity feed, and in response to activation of the respective control to establish a communication with the associated second contact via the first communication system based on at least part of the fetched contact information.

The fetched contact information may alternatively or additionally comprise presence information providing information regarding an availability of one or more of the second contacts for communication.

The client application may be configured to poll the second network apparatus for updates to the fetched contact information. The client may be configured to perform said polling periodically.

Thus the means for establishing calls or other communications with contacts via the first communication system (e.g. VoIP system) may advantageously be linked to the relative levels of activity of those contacts as occurring in respect of the second communication system (e.g. social networking site). E.g. contacts occurring within a social networking "newsfeed" are more active and therefore more likely candidates for communication. This embodiment of the present invention thus provides an improved method of establishing calls which is linked to a reflection of the activity of the contacts occurring within a second, partner communication system such as a social networking site.

In further embodiments the arrangement may comprise a plurality of second network apparatuses each of a different respective partner communication provider, and each arranged to maintain a different respective group of second contacts; wherein the communication client application may be configured to establish a plurality of contact-sharing channels each with a different respective one of the second network apparatuses.

The client application may be configured, based on at least part of the fetched contact information, to provide an option of adding at least one of the second contacts to first group of contacts.

The client application may be configured, based on at least part of the fetched contact information, to generate an invitation to at least one of the second contacts to join the first communication system.

The fetched contact information may comprise a username identifying at least one of the second contacts within the first communication system, and said communication may be established based on the username.

The fetched contact information may comprise a telephone number of at least one of the second contacts, and said communication may be established based on the telephone number.

According to another aspect of the present invention there may be provided an arrangement comprising: first network apparatus of a first communication provider, configured to provide a first communication system accessible via a client application and packet-based network, and to maintain a first list of contacts being users of the first communication system; second network apparatus of a second, partner communication provider, configured to provide a second communication system accessible via a web-browser and the packet-based network, and to maintain a second group of contacts being users of the second communication system; a user terminal installed with a web-browser for accessing the second communication system, and further installed with an independently executable client application for accessing the first communication system; wherein the client application is configured to establish a contact-sharing channel with the second network apparatus in order to fetch contact information of one or more of the second contacts, display at least part of the fetched contact information in the client application, and establish a communication with at least one of the second contacts via the first communication system based on at least part of the fetched contact information; and wherein the fetched contact information comprises at least one of: (i) an activity feed providing information on recent activity performed by one or more of the second contacts in respect of the second communication system, (ii) presence information providing information regarding an availability of one or more of the second contacts for communication, and (iii) user uploaded content uploaded to the second communication system by one or more of the second contacts.

According to another aspect of the present invention there may be provided an arrangement comprising: first network apparatus of a first communication provider, configured to provide a first communication system accessible via a client application and packet-based network, and to maintain a first list of contacts being users of the first communication system; second network apparatus of a second, partner communication provider, configured to provide a second communication system accessible via a web-browser and the packet-based network, and to maintain a second group of contacts being users of the second communication system; a user terminal installed with a web-browser for accessing the second communication system, and further installed with an independently executable client application for accessing the first communication system; wherein the client application is configured to establish a contact-sharing channel with the second network apparatus in order to fetch contact information of one or more of the second contacts, display at least part of the fetched contact information in the client application, and establish a communication with at least one of the second contacts via the first communication system based on at least part of the fetched contact information; and wherein the client application is configured to automatically maintain a list of the fetched contact information without requiring the user to initiate an operation to re-import contact information from the second communication system.

According to another aspect of the present invention, there may be provided a method of accessing a first communication system of a first communication provider via a communication client application and packet-based network, the first communication system maintaining a first list of contacts being users of the first communication system; the method comprising: establishing a contact-sharing channel with a second communication system of a second, partner communication provider, wherein the second communication system is accessible via an independently executable web-browser and the packet-based network, and wherein the second communication system maintains second group of contacts being users of the second communication system; using the contact-sharing channel to fetch contact information of one or more of the second contacts; displaying at least part of the fetched contact information in the client application; and establishing a voice or video call with at least one of the second contacts via the first communication system based on at least part of the fetched contact information, the call being established directly based on a user selection of the displayed contact information.

According to another aspect of the present invention, there may be provided a method of accessing a first communication system of a first communication provider via a packet-based network, the first communication system maintaining a first list of contacts being users of the first communication system; the method comprising: establishing a contact-sharing channel with a second communication system of a second, partner communication provider, wherein the second communication system is accessible via an independently executable web-browser and the packet-based network, and wherein the second communication system maintains second group of contacts being users of the second communication system; using the contact-sharing channel to fetch contact information of one or more of the second contacts; displaying at least part of the fetched contact information in the client application; and establishing a communication with at least one of the second contacts via the first communication system based on at least part of the fetched contact information; wherein the fetched contact information comprises at least one of: (i) an activity feed providing information on recent activity performed by one or more of the second contacts in respect of the second communication system, (ii) presence information providing information regarding an availability of one or more of the second contacts for communication, and (iii) user uploaded content uploaded to the second communication system by one or more of the second contacts.

According to another aspect of the present invention, there may be provided a method of accessing a first communication system of a first communication provider via a packet-based network, the first communication system maintaining a first list of contacts being users of the first communication system; the method comprising: establishing a contact-sharing channel with a second communication system of a second, partner communication provider, wherein the second communication system is accessible via an independently executable web-browser and the packet-based network, and wherein the second communication system maintains second group of contacts being users of the second communication system; using the contact-sharing channel to fetch contact information of one or more of the second contacts; displaying at least part of the fetched contact information in the client application; and establishing a communication with at least one of the second contacts via the first communication system based on at least part of the fetched contact information; wherein the client application automatically maintains a list of the fetched contact information without requiring the user to initiate an operation to re-import contact information from the second communication system.

In embodiments, the method aspects of the invention may comprise further method features in accordance with any of the above arrangements.

According to a further aspect of the present invention, there may be provided a client application for accessing a first communication system of a first communication provider via a packet-based network, the first communication system maintaining a first list of contacts being users of the first communication system; wherein the client application comprises code embodied on a computer-readable medium and configured so as when executed on a processor to: establish a contact-sharing channel with a second communication system of a second, partner communication provider, wherein the second communication system is accessible via an independently executable web-browser and the packet-based network, and wherein the second communication system maintains second group of contacts being users of the second communication system; use the contact-sharing channel to fetch contact information of one or more of the second contacts; display at least part of the fetched contact information in the client application; and establish a voice or video call with at least one of the second contacts via the first communication system based on at least part of the fetched contact information, the call being established directly based on a user selection of the displayed contact information.

According to another aspect of the invention, there may be provided a client application for accessing a first communication system of a first communication provider via a packet-based network, the first communication system maintaining a first list of contacts being users of the first communication system; wherein the client application comprises code embodied on a computer-readable medium and configured so as when executed on a processor to: establish a contact-sharing channel with a second communication system of a second, partner communication provider, wherein the second communication system is accessible via an independently executable web-browser and the packet-based network, and wherein the second communication system maintains second group of contacts being users of the second communication system; use the contact-sharing channel to fetch contact information of a specified one or more of the second contacts; display at least part of the fetched contact information in the client application; and establish a communication with at least one of the specified second contacts via the first communication system based on at least part of the fetched contact information; wherein the fetched contact information comprises at least one of: (i) an activity feed providing information on recent activity performed by one or more of the second contacts in respect of the second communication system, (ii) presence information providing information regarding an availability of one or more of the second contacts for communication, and (iii) user uploaded content uploaded to the second communication system by one or more of the second contacts.

According to another aspect of the present invention, there may be provided a client application for accessing a first communication system of a first communication provider via a packet-based network, the first communication system maintaining a first list of contacts being users of the first communication system; wherein the client application comprises code embodied on a computer-readable medium and configured so as when executed on a processor to: establish a contact-sharing channel with a second communication system of a second, partner communication provider, wherein the second communication system is accessible via an independently executable web-browser and the packet-based network, and wherein the second communication system maintains second group of contacts being users of the second communication system; use the contact-sharing channel to fetch contact information of a specified one or more of the second contacts; display at least part of the fetched contact information in the client application; and establish a communication with at least one of the specified second contacts via the first communication system based on at least part of the fetched contact information; wherein the client application automatically maintains a list of the fetched contact information without requiring the user to initiate an operation to re-import contact information from the second communication system.

In embodiments, the client application aspects of the invention may be configured in accordance with any of the arrangements or methods above.

BRIEF DESCRIPTION OF THE DRAWINGS

Fore a better understanding of the present invention and to show how it may be put into effect, reference is made by way of example to the accompanying drawings in which.

DETAILED DESCRIPTION OF PREFERRED EMBODIMENTS

Figure 1:
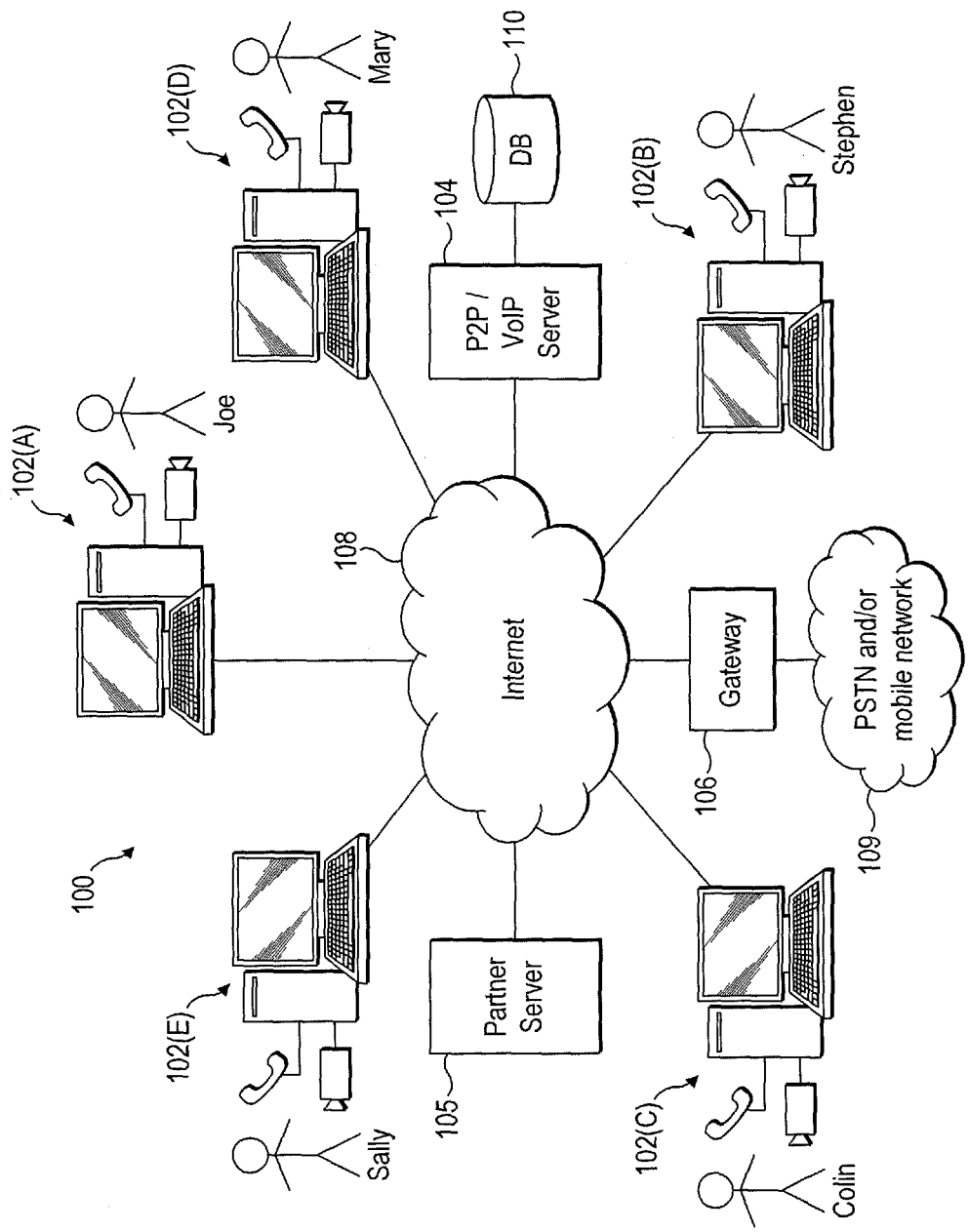
FIG. 1 is a schematic illustration of an arrangement involving a packet-based network.

FIG. 1 is a schematic illustration of an arrangement 100 involving a packet-based network such as the Internet 108. The arrangement comprises a plurality of user terminals 102 such as desktop or laptop computers or internet-enabled mobile phones, each comprising a network interface 202 such as a wired or wireless modem for connecting to other devices or terminals 102, 104, 105, and/or 106 over the Internet 108. Some details of an example user terminal 102 are illustrated schematically in FIG. 2.

Two communication systems are provided over the Internet 108 by two separate communication providers: a first communication system is provided by means of first network apparatus 104 in the form of one or more first server units and associated database 110, and a second communication system is provided by means of second network apparatus 105 in the form of one or more second server units. In the following the term "server" will be used in the singular, but it will be appreciated that this is not intended to exclude the possibility of multiple server units which may or may not be implemented on the same site or in the same housing.

Each of the first and second servers 104 and 105 maintains a separate user base, the first network apparatus 104 maintaining a first user base being users of the first communication system, and a the second network apparatus 105 maintaining a second user base being users of the second communication system. According to the present invention, the first communication provider and second communication provider act in partnership in order to share user bases and thus improve the interoperability of the two systems.

By way of example, the first communication system may comprise a VoIP communication system and the second communication system may comprise a social networking site.

Each of the first and second servers 104 and 105 is accessible to each of the user terminals 102 via the Internet 108 given suitable software. To that end, each user terminal 102 may be installed with one or both of: a web-browser application 221 for accessing web servers including the second server 105 of the social networking site, and a separate communication client application 222 for accessing the VoIP communication system including access to the VoIP server 104. The client application 222 is executable independently from the web-browser application 221 in that it can be launched separately and one need not necessarily be running in order to run the other (though this does not exclude the possibility that the two applications 221, 222 may be able to communicate with one another for certain purposes, e.g. via a plug-in).

In operation, each user of the VoIP communication system is allowed access to the contact information of a subset of the user base maintained by the VoIP server 104, this subset being referred to as a contact list or contact group. Typically the contact list is defined by users who have mutually agreed to become one another's contacts. When a user logs on to his or her VoIP client application 222 it retrieves the contact list from the VoIP server 104, and may subsequently poll the VoIP server 104 for updates to the contact information of the contacts on the contact list. Contact information may comprise for example a username, phone number, a profile picture to represent the contact, and/or a "mood message" giving a brief statement about the contact.

When a user (the caller) wants to make a voice or video call to a contact (the callee), the caller's client 222 submits a request comprising the username of that contact to an address look-up table which maps usernames to IP addresses. In the case of a peer-to-peer (P2P) system, the look-up table may be implemented in the form of a distributed database distributed amongst other users' terminals 102 of the VoIP system. In other systems the look-up table may be implemented on one or more centralised server units 104. Either way, in response to the request, the look-up table returns the corresponding IP address of the contact's user terminal 102(B) to the caller's user terminal 102(A). The client 222 running on the caller's terminal 102(A) can then use the IP address to set up a communication channel with the client running on the contact's user terminal 102(B) and use this communication channel to conduct a voice or video call.

The client application 222 also allows calls to be made to a traditional circuit-switched network 109 such as a fixed-line network or mobile cellular network. These calls are made by establishing a communication channel with a gateway 106 coupled between the Internet 108 and circuit-switched network 109, and supplying a suitable telephone number from the client 222 to the gateway 106.

With regard to the social networking site, each contact within the social networking site uploads information such as messages and photos to the web server 105, and this information is then accessible from the server 105 to the user via the web-browser 221. Each user is only allowed access to the information of contacts on a contact list, being a subset of the user base maintained by the social networking server 105. The contact list of the social networking site is distinct from that of the VoIP system (even if partially coincident).

Thus the VoIP contacts are associated with the user's VoIP account and the social network contacts are associated with the user's social networking account.

Figure 2:
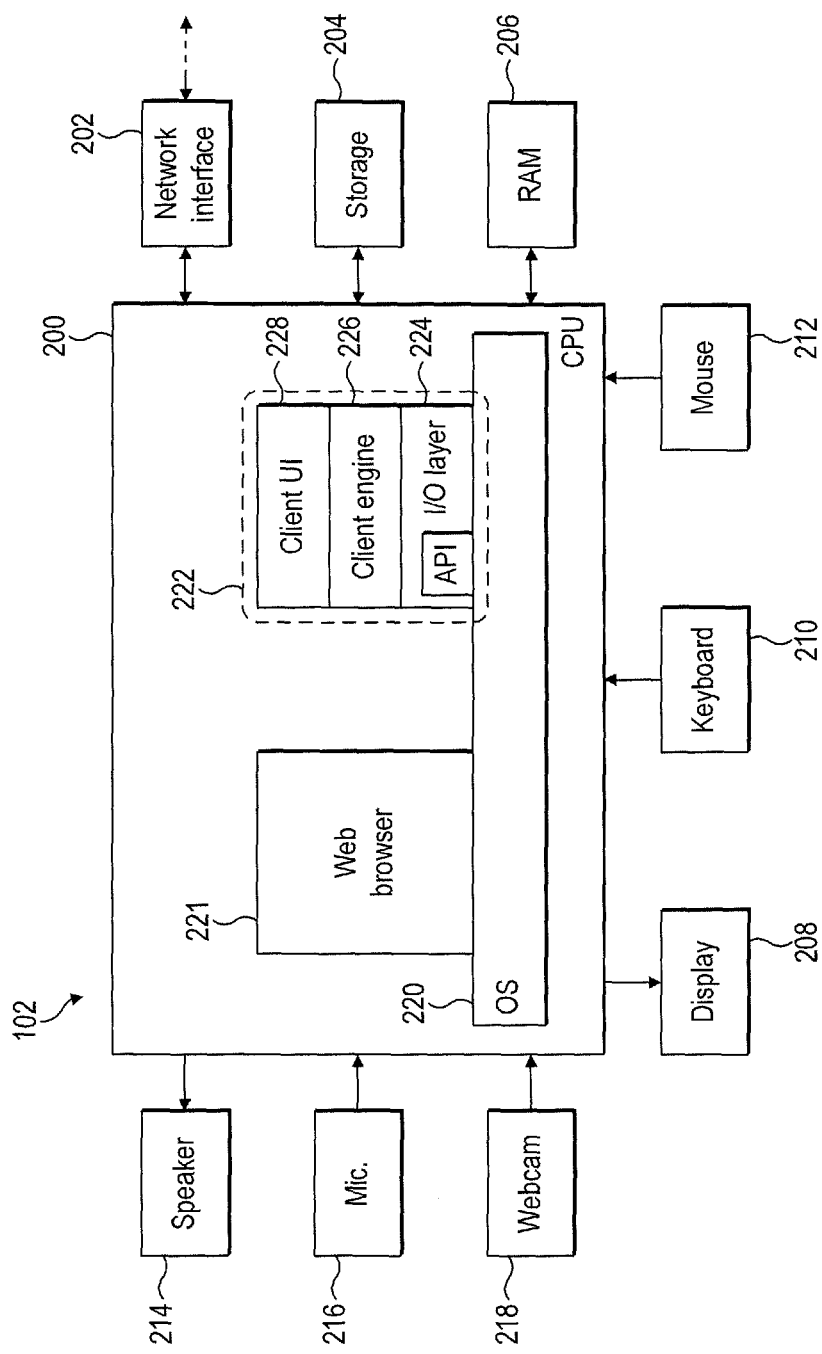
FIG. 2 is a schematic block diagram of a VoIP client application and web-browser application running on a user terminal.

An example user terminal 102 is shown schematically in FIG. 2. The user terminal 102 comprises a CPU 200 executing the web-browser application 221 and client application 222 under control of an operating system 220. The CPU 200 is coupled to: a network interface 202 for connecting to the Internet 108, a storage device 204 such as a hard drive or flash memory storing the client application 222, a RAM 206, one or more user input devices such as a keyboard 210 and mouse 212, a display screen 208 for displaying video and the user interface of the client 222 and web-browser 221, a speaker for outputting audio such as the decoded speech signal of a call, a microphone 216 for receiving input speech signals, and a webcam 218 for receiving video signals.

The client application 222 comprises a protocol stack having an input-output (I/O) layer 224, a client engine 226, and a UI layer 228. The I/O layer 224 comprises an audio and/or video codec responsible for encoding speech and video signals from the microphone 216 and/or webcam 218 for transmission via the network interface 202 over the Internet 108, and for decoding encoded speech and video signals received from other such user terminals 102 via the Internet 108 and network interface 202 for output to the speaker 214 and display 208 respectively. The I/O layer 224 also comprises an API protocol for accessing the partner web server 105 of the social networking site.

The client engine 228 is then responsible for higher-level functions such as retrieving the contact list, uploading the user's own contact information, call set-up, connection management, and other functions such as exchanging presence information with contacts. The UI layer 228 generates outputs the user interface of the client 222 to the display 208, including on-screen controls for controlling the overall operation of the client 222 in response to user inputs from the user input devices 210 and/or 212.

Figure 3:
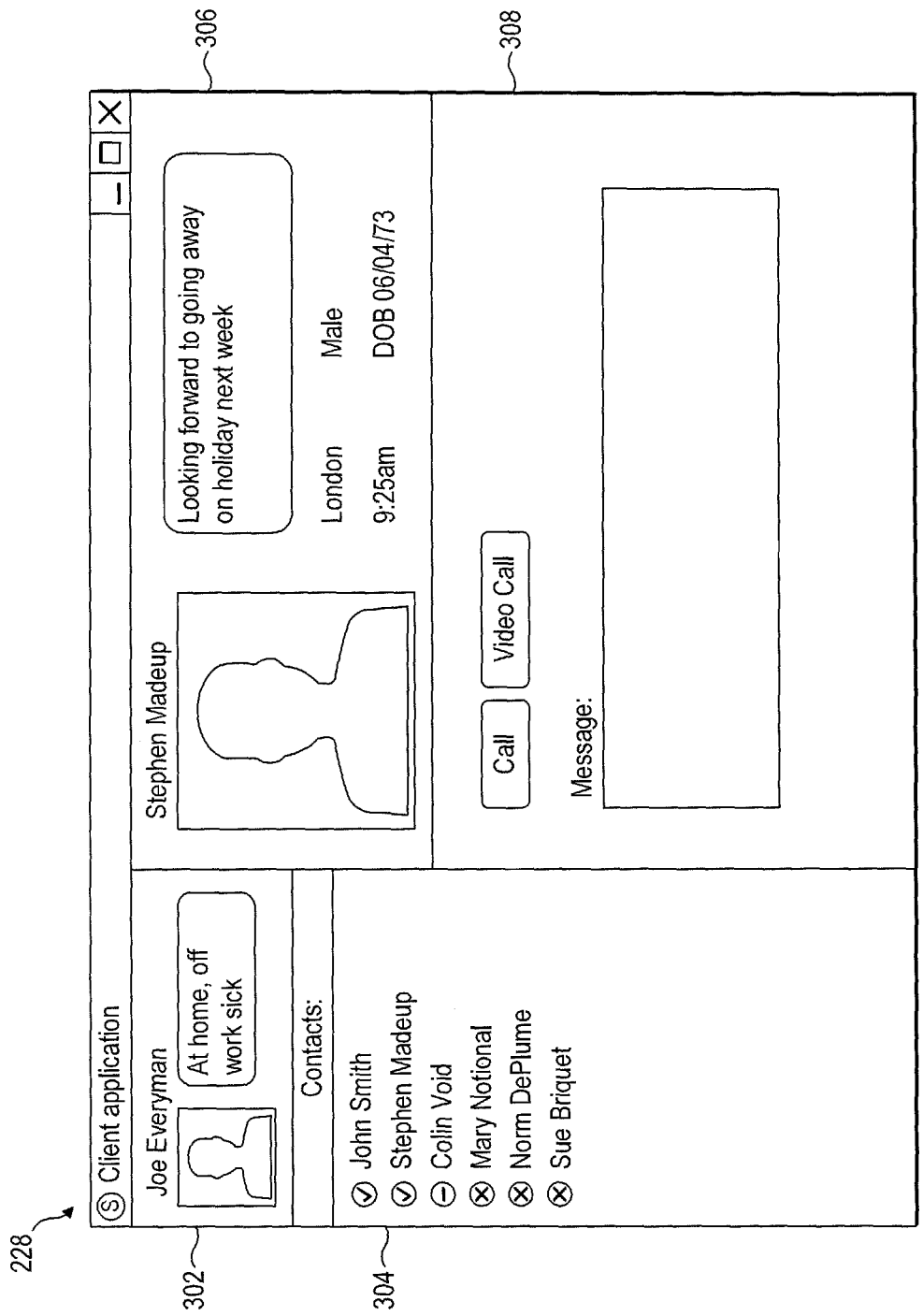
FIG. 3 is a schematic representation of the user interface of a VoIP client application, FIGS. 4*a* and 4*b* provide schematic representations of the user interface of a VoIP client accessing contact information of a social networking site.

An example user interface of a client application 222 is shown in FIG. 3. This may comprise a panel showing the user's own profile 302, a contact list panel 304, a panel showing the profile of a selected one of the contacts 306, and a control panel 308 comprising on-screen controls for establishing communications such as voice or video calls or IM chat messages with one or more selected contacts.

The contact list panel 304 displays contact information for each of the contacts in the user's contact list, such as the contact's names. The contact list panel 304 may also display other information associated with the contacts such as their presence. The presence information indicates the availability of the contact for communication and preferably is at least partially defined by the contact themselves. E.g. the presence information could comprise an indication that the contact is offline (x), online but has selected to be unavailable (-), or online and has selected to be available (√). Some other information such as a contact's profile picture or mood message may also be displayed in the profile panel 306. Further, note that some of the contact information such as a contact's username need not necessarily be displayed explicitly on the screen.

According to preferred embodiments of the present invention, the VoIP client application 222 is enhanced in order to provide additional functionality for integrating with the contacts of the social networking site.

A user's VoIP client account and social networking site account are linked so that the user can receive, in the VoIP client 222, contact information for the contacts associated with the social networking site from the social networking server 105 and then initiate a communication event from the VoIP client 222 to a contact associated with the social networking site, using the received contact information. For contacts associated with both the social networking site and the VoIP system, the user may call the contact using contact information stored by the VoIP server 104 or provided from the social networking site server 105, e.g. using a username of the contact for the VoIP system which may be provided from either the VoIP server 104 or the social networking server 105. Otherwise the contact information could comprise other contact means such as a phone number for calling the contact via a gateway 106 and circuit-switched network 109.

The invention thus allows users to communicate with at least two groups of contacts from within one communication client.

The user may link his or her VoIP account with their social network account and thereby establish a content-sharing channel from the social networking web server 105 to the VoIP client application 222. Once the accounts are thus linked, information is retrieved from the user's social network account(s) 105 and provided to the VoIP client 222. Note that "sharing" does not necessarily imply a mutual exchange of contact information—the VoIP client 222 need not share its own contacts with the social networking site, although that possibility is not excluded either. Data that could be sent from the client to the social networking site includes: the user's mood message (which would be presented as their status in the social networking site), and comments on elements of a newsfeed associated with the user.

Figure 4A:
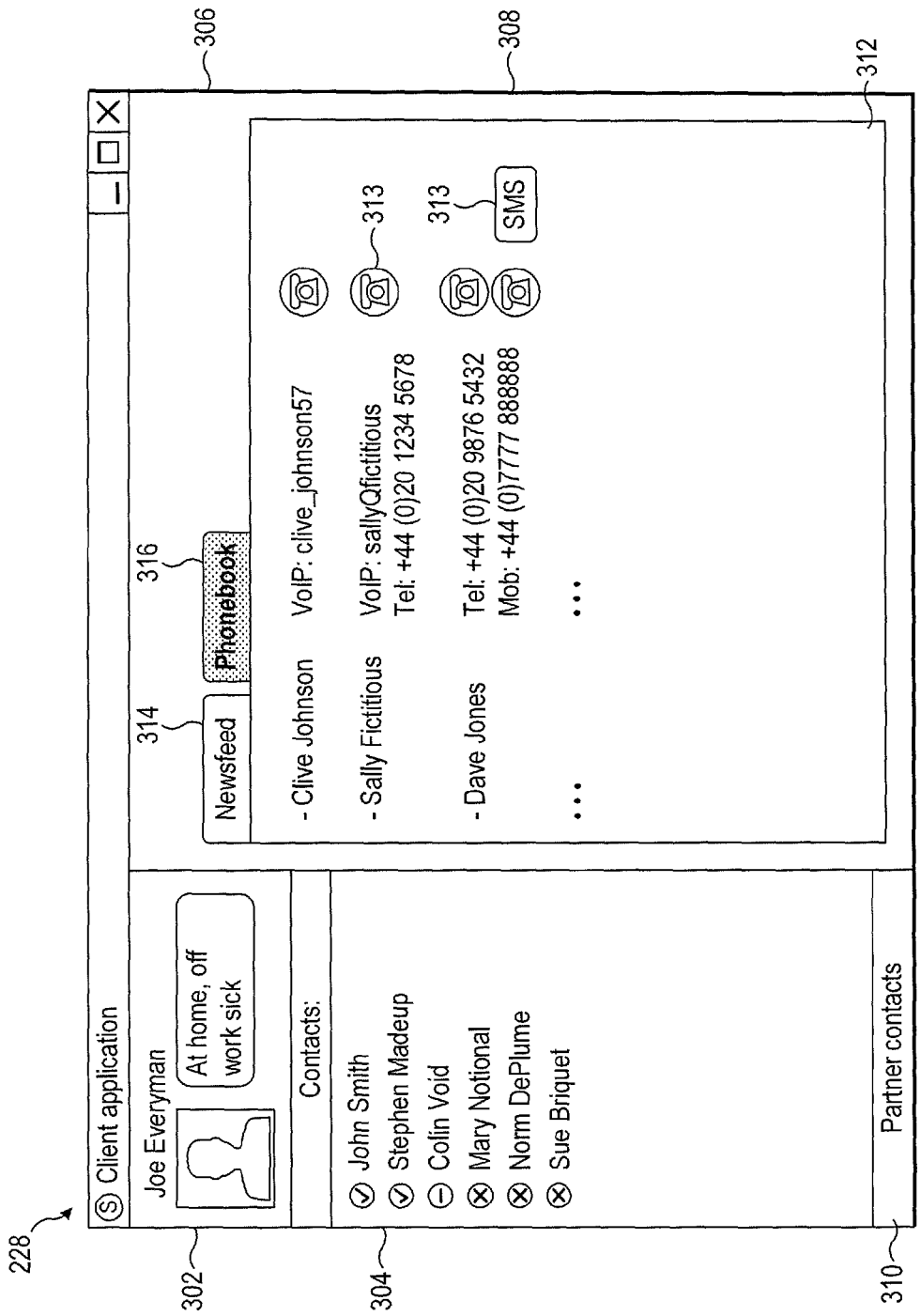
Figure 4B:
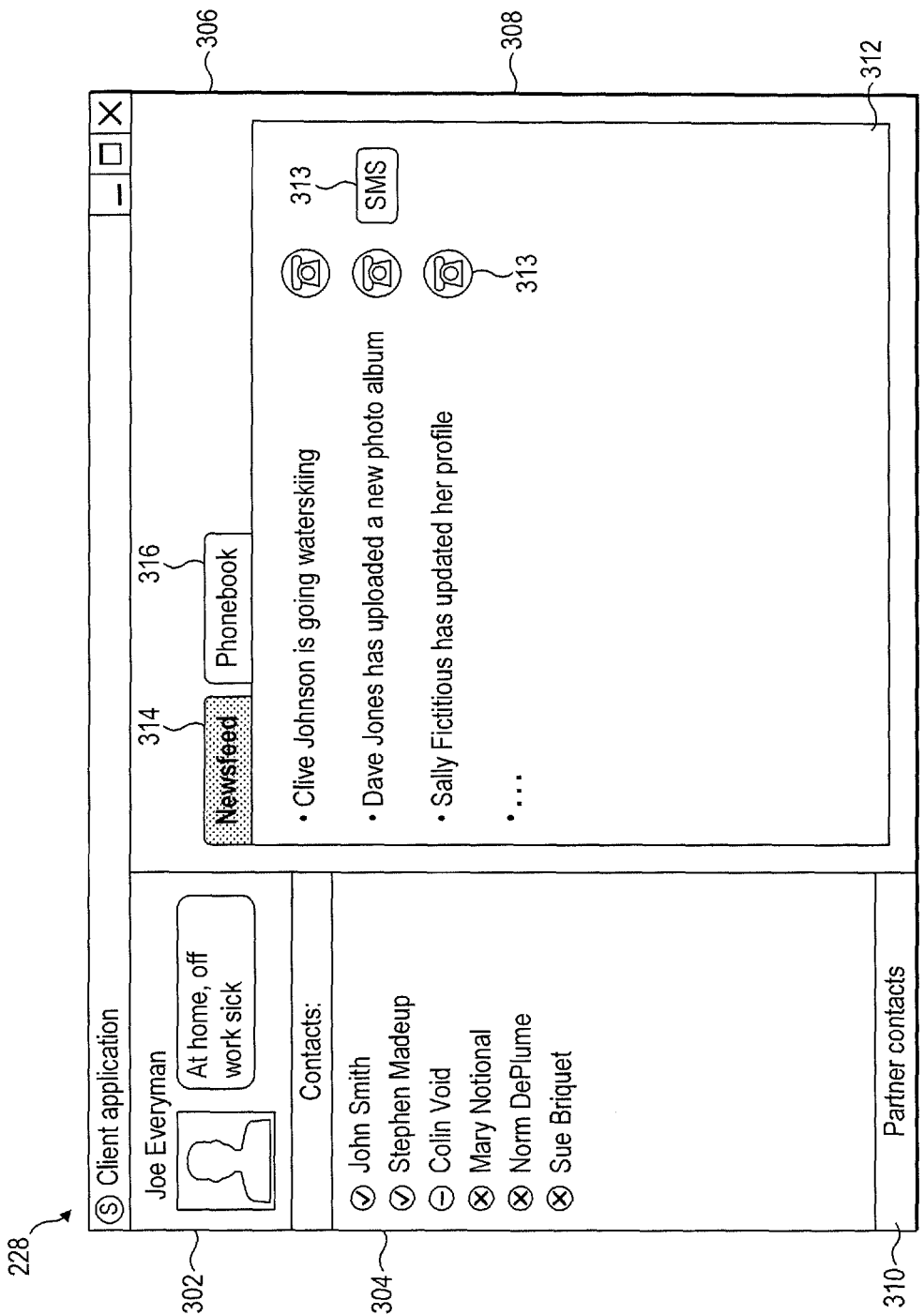

As illustrated in the schematic example of FIGS. 4a and 4b, social network content may appear in a main panel 312 of the VoIP client 22 when the social network channel is selected. There may be two tabs—one displays a news feed received from the social network account (FIG. 4b), the other displays the contact list received from the social network account (FIG. 4a). Contacts that are on the user's social networking contact list but not on the user's VoIP contact list are thus made clearly visible to the user within the VoIP client application 222, and can either be added as VoIP contact or called from the client without being added as a VoIP contact.

In embodiments, the contact information retrieved from the social networking account may comprise a username for use in the VoIP system, and/or one or more telephone numbers such as mobile or landline number. The client 222 may provide a choice of different communication methods for communicating with the retrieved contact such as a VoIP-to-VoIP call using a VoIP username of the contact, a landline call using a landline phone number of the contact, mobile phone call or SMS message using a mobile phone number of the contact, or an IM chat message. Communication controls 313 are preferably generated on screen within the VoIP client application 222 in association with one or more of the displayed contacts from the social networking site (FIG. 4a) and/or in association with one or more of the feeds from the social networking site (FIG. 4b). These communication controls 313 may take any form such as buttons or drop-down menus, and when activated allow the user of the client application 222 to initiate a communication with the associated contact. Preferably the communication controls 313 allow the user to communicate with the contact via a selected one of a plurality of available modes of communication, such as VoIP-VoIP call, landline call, mobile phone call or SMS.

In a preferred embodiment of the invention, multiple contact-sharing channels may be received by the client 222. Each channel may receive content from a different website.

A user may choose to link his or her VoIP account to his or her social networking site by, for example, selecting an option in the "view" menu, or selecting a dedicated button 310, or in response to being prompted by a notification or a dynamic content message from another network element (a dynamic content message is a message containing an indication of a trigger condition for displaying the message content—see publication number US 2009-0125593, application Ser. No. 11/937,069—which could be adapted to prompt the user to import contacts upon detecting occurrence of a trigger condition defined in the message). When a "link account" option is selected, the client application 222 fetches contact information from the social networking account maintained on the second, partner server 105. Preferably, the VoIP client 222 polls the social networking site server 105 multiple times so as to update the contact information, and preferably the polling is performed periodically so as to retrieve periodic updates.

In order to link accounts, preferably the user is required to provide login details that are sent from the client 222 to the social networking site to retrieve content, and optionally an authorisation token may be used to allow the client to fetch updated content.

Based on the retrieved contact information, the user can place a call to a contact associated with the social network account 105 from the VoIP client 222. For example this may be achieved by operating on-screen controls 313 generated and displayed by the VoIP client 222 in association with the fetched contacts.

The contact information retrieved from the social networking account may further comprise user uploaded content uploaded to the second, partner communication system by the contact from that partner communication system. This user uploaded content may comprise for example photos, videos, comments, and/or status updates (e.g. mood messages or other such short messages about how the user is currently feeling or what they are doing, etc.).

The contact information retrieved from the social networking account may further comprise presence information of the contact from the second, partner communication system, indicating some information about the online availability of that contact within the partner communication system (e.g. online, offline, or online but chosen to be unavailable).

A particularly preferred and advantageous embodiment of the present invention is that exemplified in FIG. 4a. Here, the VoIP client 222 retrieves contact information in the form of an activity feed or "newsfeed" from the social networking server 105. The newsfeed provides information on the contact's recent activity on the social networking site, e.g. indicating updates to the contact's profile information within the social networking site or indicating user-content that the contact has uploaded to the social networking site. By "recent" activity is typically meant time-ordered information, with most recent activity being displayed first or most prominently within the feed, and less recent activity being displayed later or at a less-prominent position within the feed. The VoIP client application 222 also preferably generates one or more respective on-screen controls 313 in association with each contact occurring in the newsfeed. If the local user of the VoIP client 222 activates the control 313 displayed in association with a respective contact in the newsfeed, the VoIP client uses other information fetched from the social networking server 105 such as a username or a telephone number for the contact to establish a call or other communication via the VoIP system.

The news feed may be displayed in a "web window" of the client 222. The web window utilises browser software on the user terminal to display web content in the web window. Alternatively the client may include browser software to display web content in the web window. The web window is a feature of the client that incorporates at least some web browser type functionality into the client, allowing it to display web content in a window of the client 222 (e.g. allowing it to display HTML, XML or other hypertext or mark-up language content, or to display content generated by CGI scripts or Java or other applets, etc.)

The effect of this embodiment is that the means of establishing calls or other communications with the contacts via the first communication system 104, 222 (e.g. VoIP system) is advantageously linked to the relative levels of activity of those contacts as occurring in respect of the second communication system 105, 221 (e.g. social networking site). That is, contacts occurring within the newsfeed are more active and therefore more likely candidates for communication. Compared with a more conventional contact list 304, this embodiment of the present invention thus provides an improved method of establishing calls which is linked to a reflection of the activity of the contacts occurring within a second, partner communication system such as a social networking site.

In further embodiments, the VoIP client 222 preferably recognises if any of the social network site contacts are also contacts within the VoIP system. This may be achieved by comparing emails (or hashes of emails). The user mat be able to access alternative contact details for one contact from a drop down menu. If the contact is associated with both the VoIP system and the social network site, the drop down menu may be populated by contact information stored in the contact in addition to information received in the feed.

If the social network site contact is not a contact of the user within in the VoIP system, but it is apparent from the contact information received in the feed that the contact is nonetheless a user of the VoIP system, then an option to add the contact as a VoIP contact may be presented to the user. If the option is selected, the client sends a contact request to the contact's Skype username via Skype.

Alternatively if the contact information does not include a VoIP username, an option to invite the social networking contact to join the VoIP system may be shown. In this case the friend request may be sent via email. The client 222 may provide an email server with the email address of the social network contact. The email server then generates an invite email.

If the 'phonebook' tab is selected the contact list retrieved from the social network account is displayed in the client. The contact list from the social networking site may be searched in the client.

At any point the user may disconnect the accounts and terminate the feed.

Note that whilst it has also been possible in previous systems for the user to 'import contacts' from a social networking website to an instant messaging or VoIP client, in this case the user may only communicate with another user who is already signed up to use the instant messaging service. The user must otherwise invite the user to sign up to the VoIP or instant messaging service. In embodiments of the present invention on the other hand, if the contact information comprises information such as a mobile or landline telephone number then a call can be established only based on the existing status of the callee as having been accepted as a contact of the caller within the partner communication system, without requiring the callee to necessarily be accepted as a contact in the first communication system (although the contact can also optionally be invited to join the first communication system and become a contact of that system if desired).

Furthermore, in previous systems, when the user selects to import contacts to the client it is necessary for the user to select which contacts he wishes to import. Should the user decide that he wishes to communicate with any other contacts from the social networking site it is necessary for him to perform a further 'import contacts' operation. Embodiments of the present invention on the other hand maintain a list of contact information from the partner system, e.g. under one or more web window tabs, without requiring the user to manually initiate repeated operations to re-import the partner contact information. This could comprise the client application 222 automatically updating the contact information of contacts imported from the partner communication system (e.g. updating presence information ro a newsfeed), and/or the client 222 automatically updating the list with new contacts from the partner communication system.

It will be appreciated that the above embodiments have been described only by way of example. For instance, the invention may be applied to other types of communication client, such as IM clients, and may be used to retrieve contact information from other partner communication systems accessed via web-browsers, such as Internet forums or blog sites. Further, other types of authorisation mechanism may be employed, and other methods of call or connection set-up used. Other variants may be apparent to a person skilled in the art given the disclosure herein. The invention is not limited by the described embodiments but only by the appendant claims.

The invention claimed is:

1. An arrangement comprising:
  a user terminal installed with a client application for access a first communication system, and further installed with a web-browser for accessing a second communication system, the first communication system configured to maintain a first group of first contacts comprising users of the first communication system, and the second communication system configured to maintain a second group of second contacts comprising users of the second communication system, the first group of first contacts different than the second group of second contacts;
  the client application configured to:
    establish a contact-sharing channel with the second communication system;
    fetch, using the contact-sharing channel, contact information of one or more of the second contacts and an activity feed providing information on recent activity performed by the one or more of the second contacts;
    display at least part of the activity feed within a user interface of the client application, the at least part of the activity feed comprising at least two recent activities performed by at least two different second contacts, the recent activities time-ordered such that a most-recent activity is displayed first in the activity feed;

display a control proximate each of the at least two recent activities of the activity feed, each control configured to initiate a communication with a respective one of the at least two different second contacts associated with the recent activity of the activity feed that is proximate to the control; and in response to a selection of a respective one of the controls, establish a communication with an associated second contact via the first communication system based at least in part on the fetched contact information.

2. The arrangement of claim 1, wherein the client application is configured to automatically maintain a list of the fetched contact information without requiring a user to initiate an operation to re-import contact information from the second communication system.

3. The arrangement of claim 1, wherein:
the first communication system is configured to require users to be accepted as contacts to communicate with one another, and the second communication system is configured to require users to be accepted as contacts to communicate with one another, and the client application is configured to establish said communication via the first communication system based on acceptance of the associated second contact as a contact within the second communication, without requiring acceptance of the associated second contact as a contact within the first communication system.

4. The arrangement of claim 1, wherein the fetched contact information further includes presence information providing information regarding an availability of one or more of the second contacts for communication.

5. The arrangement of claim 1, wherein the client application is configured to poll the second communication system for updates to the fetched contact information.

6. The arrangement of claim 5, wherein the client application is configured to perform said polling periodically.

7. The arrangement of claim 1, wherein the first communication system comprises a voice and/or video over internet protocol (VoIP) communication system accessible via a VoIP client and the Internet, and wherein the first group of first contacts includes users of the VoIP communication system.

8. The arrangement of claim 1, wherein the second communication system comprises a social-networking communication system accessible via the web-browser and the Internet.

9. The arrangement of claim 1, wherein the client application is configured, based on at least part of the fetched contact information, to provide an option of adding at least one of the second contacts to the first group of first contacts.

10. The arrangement of claim 1, wherein the client application is configured, based on at least part of the fetched contact information, to generate an invitation to at least one of the second contacts to join the first communication system.

11. The arrangement of claim 1, wherein the fetched contact information comprises a username identifying at least one of the second contacts within the second communication system, and wherein said communication is established based on the username.

12. The arrangement of claim 1, wherein the fetched contact information comprises a telephone number of at least one of the second contacts, and wherein said communication is established based on the telephone number.

13. A method of accessing a first communication system of a first communication provider via a communication client application and a packet-based network, the first communication system configured to maintain a first group of first contacts comprising users of the first communication system, the method comprising:

establishing a contact-sharing channel with a second communication system of a second communication provider, the second communication system accessible via an independently executable web-browser and the packet-based network, and the second communication system configured to maintain a second group of second contacts comprising users of the second communication system;

fetching, using the contact-sharing channel, contact information of one or more of the second contacts and an activity feed providing information on recent activity performed by the one or more of the second contacts;

displaying at least part of the activity feed within a user interface of the client application, the at least part of the activity feed comprising at least two recent activities performed by at least two different second contacts, the recent activities time-ordered such that a most-recent activity is displayed first in the activity feed;

displaying a control proximate each of the at least two recent activities of the activity feed, each control configured to initiate a communication with a respective one of the at least two different second contacts associated with the recent activity of the activity feed that is proximate to the control; and in response to a selection of a respective one of the controls, establishing a communication with an associated second contact via the first communication system based at least in part on the fetched contact information, the first group of first contacts different than the second group of second contacts.

14. The method of claim 13, wherein the client application automatically maintains a list of the fetched contact information without requiring a user to initiate an operation to re-import contact information from the second communication system.

15. The method of claim 13, wherein:
the first communication system is configured to require users to be accepted as contacts to communicate with one another, and the second communication system is configured to require users to be accepted as contacts to communicate with one another, and the method further comprises establishing said communication via the first communication system based on acceptance of the at least one second contact as a contact within the second communication, without requiring acceptance of the associated second contact as a contact within the first communication system.

16. The method of claim 13, wherein the fetched contact information further includes presence information providing information regarding an availability of one or more of the second contacts for communication.

17. The method of claim 13, further comprising polling the second network apparatus for updates to the fetched contact information.

18. The method of claim 17, wherein the client application is configured to perform said polling periodically.

19. The method of claim 13, wherein the first communication system comprises a network apparatus of a voice and/or video over internet protocol (VoIP) provider which provides a VoIP communication system accessible via a VoIP client and the Internet, and wherein the first group of contacts includes users of the VoIP communication system.

20. The method of claim 13, wherein the second communication system comprises a network apparatus of a partner social-networking provider, the social-networking provider configured to provide a social-networking communication system accessible via the web-browser and the Internet.

21. The method of claim 13, further comprising providing, based on at least part of the fetched contact information, an option of adding at least one of the second contacts to the first group of first contacts.

22. The method of claim 13, further comprising generating, based on at least part of the fetched contact information, an invitation to at least one of the second contacts to join the first communication system.

23. The method of claim 13, wherein the fetched contact information comprises a username identifying at least one of the second contacts within the second communication system, and wherein said communication is established based on the username.

24. The method of claim 13, wherein the fetched contact information comprises a telephone number of at least one of the second contacts, and wherein said communication is established based on the telephone number.

25. A storage device having instructions stored thereon that, when executed by a processor, implement a client application for accessing a first communication system of a first communication provider via a packet-based network, the first communication system configured to maintain a first group of first contacts comprising users of the first communication system, the client application configured to:

establish a contact-sharing channel with a second communication system of a second communication provider, the second communication system accessible via an independently executable web-browser and the packet-based network, and the second communication system configured to maintain a second group of second contacts comprising users of the second communication system;

fetch, using the contact-sharing channel, contact information of one or more of the second contacts and an activity feed providing information on recent activity performed by the one or more of the second contacts;

display at least part of the activity feed within a user interface of the client application, the at least part of the activity feed comprising at least two recent activities performed by at least two different second contacts, the recent activities time-ordered such that a most-recent activity is displayed first in the activity feed;

display a control proximate each of the at least two recent activities of the activity feed, each control configured to initiate a communication with a respective one of the at least two different second contacts associated with the recent activity of the activity feed that is proximate to the control; and in response to a selection of a respective one of the controls, establish a communication with an associated second contact via the first communication system based at least in part on the fetched contact information, the first group of first contacts different than the second group of second contacts.

* * * * *